July 25, 1967 W. C. CAMMAERT 3,332,186
SYSTEM FOR SECURING CORRUGATED SHEETING
Filed May 22, 1964 3 Sheets-Sheet 1
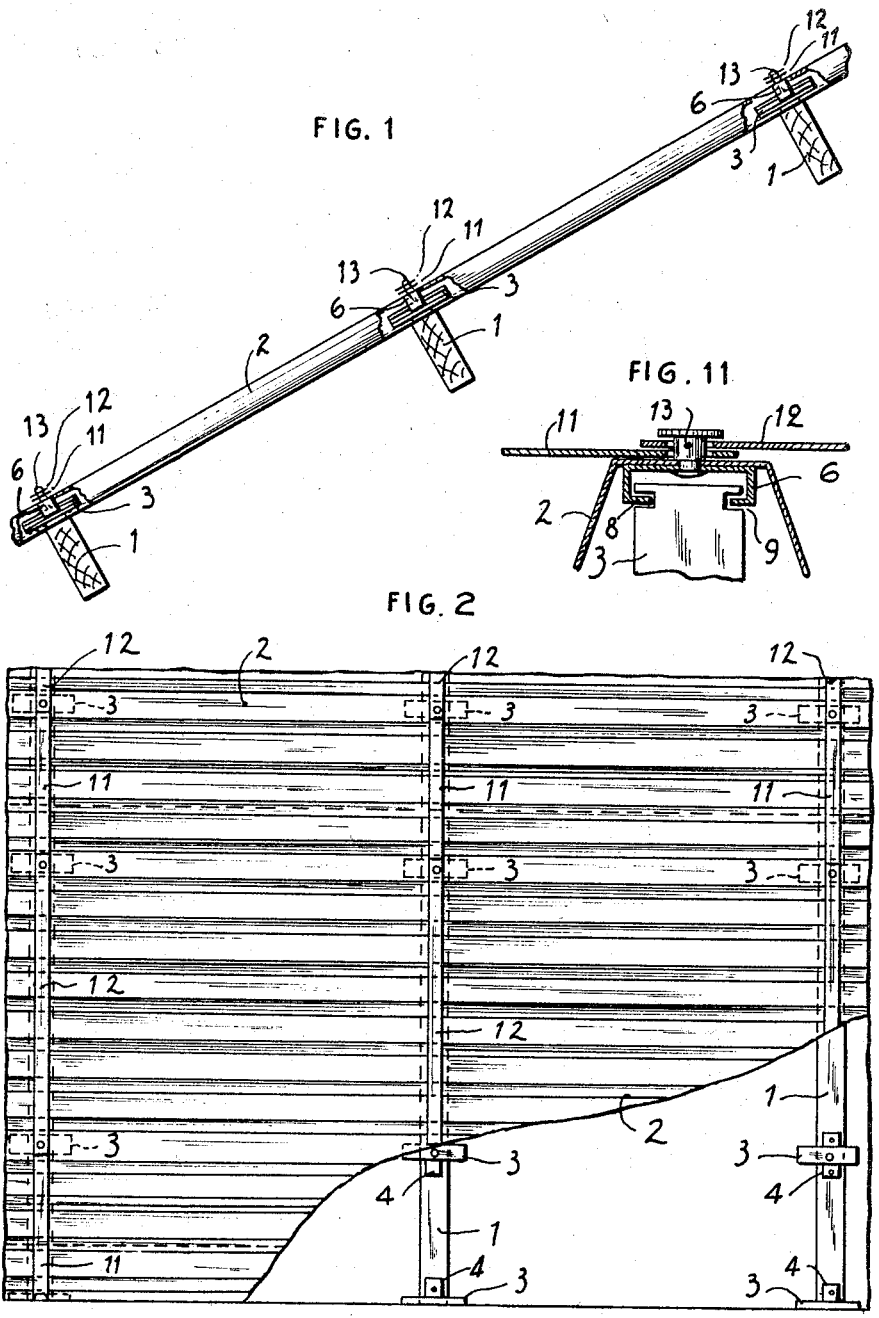
INVENTOR.
WILLY CHARLES CAMMAERT
BY
McGlew & Toren
ATTORNEYS.

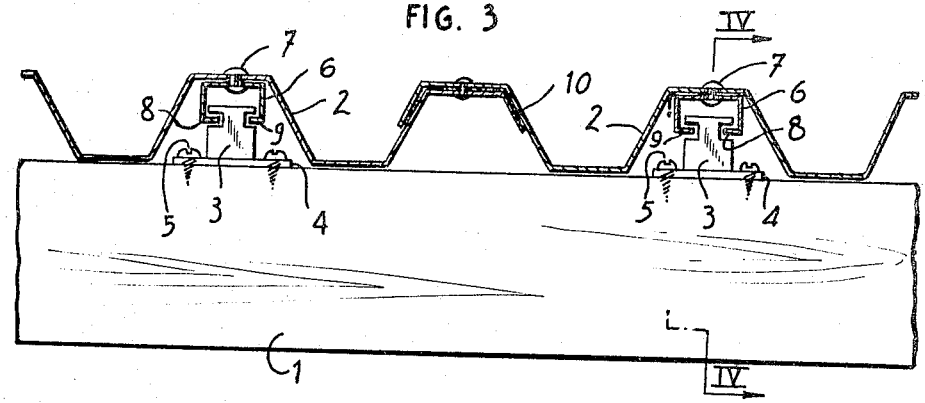
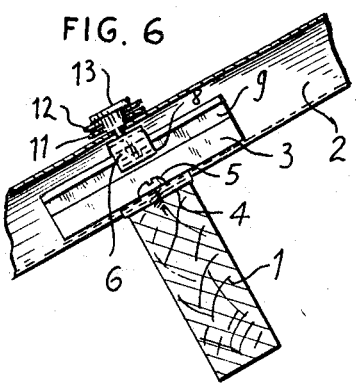
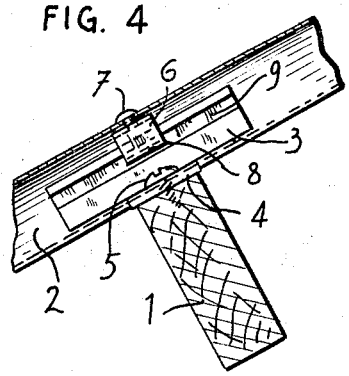
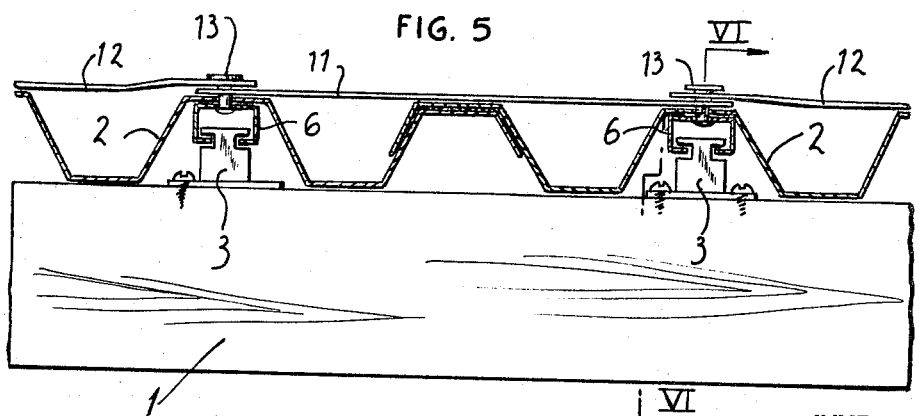

July 25, 1967  W. C. CAMMAERT  3,332,186
SYSTEM FOR SECURING CORRUGATED SHEETING
Filed May 22, 1964  3 Sheets-Sheet 3
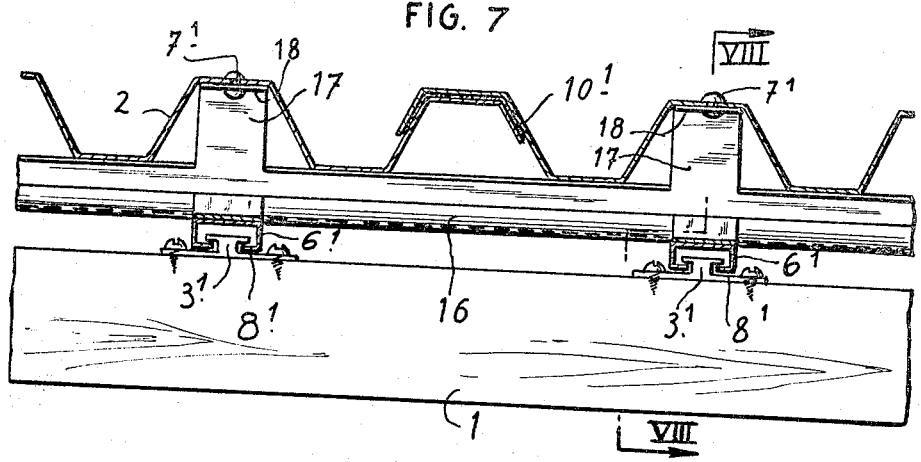
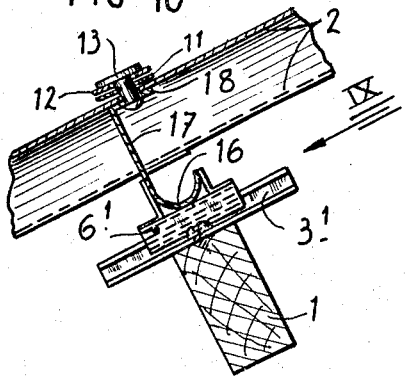
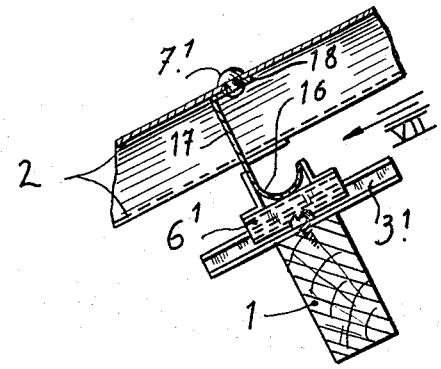
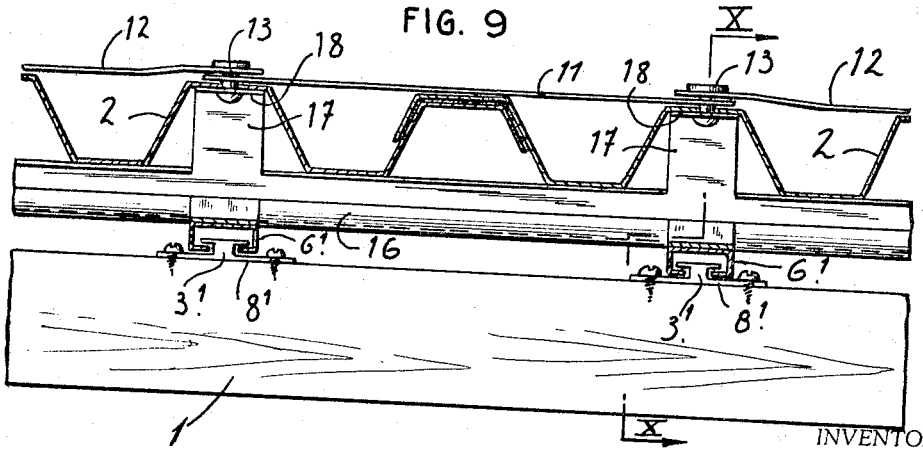
INVENTOR.
WILLY CHARLES CAMMAERT
BY
McGlew & Toren
ATTORNEYS.

United States Patent Office 3,332,186
Patented July 25, 1967

3,332,186
SYSTEM FOR SECURING CORRUGATED SHEETING
Willy Charles Cammaert, Berchem, Brussels, Belgium, assignor to Solvay & Cie, Brussels, Belgium
Filed May 22, 1964, Ser. No. 369,463
Claims priority, application Belgium, May 22, 1963, 632,661
7 Claims. (Cl. 52—302)

This invention relates to a system for securing metal, or preferably plastic, corrugated sheeting, more particularly as roofing, in a construction comprising a gutter for water of condensation.

Roof sheeting made of a material liable to contraction or expansion on temperature changes undergoes distortion if the sheeting is rigidly secured. When this occurs rain may enter and the water-proofing properties deteriorate. Moreover, since such sheeting is made of a material which is not water-absorbent, condensation effects are more pronounced than with a more porous material.

The object of the invention is to obviate these difficulties. To this end, the sheeting is secured by means of a slideway and a sliding member so co-operating as to be able to move or be displaced relative to one another.

A gutter, whose shape is adapted to the corrugated shape of the sheeting used and to the securing system provided, is secured on one side to each or all the sheeting elements and, on the other side, to a slideway secured to the support (a purlin, beam, girder, etc.).

In order that the invention may be more readily understood, various embodiments thereof will be described hereinbelow with reference to the accompanying drawings wherein:

FIG. 1 is a section of a sloping roof to which the invention has been applied;

FIG. 2 is a plan view corresponding to FIG. 1;

FIG. 3 is a section of a first embodiment of the securing system;

FIG. 4 is a section on the line IV—IV in FIG. 3;

FIGS. 5 and 6 relate to a variant of the construction according to FIGS. 3 and 4;

FIG. 7 is a sectional view, looking in the direction of the arrow VII of FIG. 8, and illustrating a gutter included in the system;

FIG. 8 is a sectional view on the line VIII—VIII of FIG. 7;

FIG. 9 is a view looking in the direction of the arrow VIIII—VIIII of FIG. 10;

FIG. 10 is a sectional view taken on the line X—X of FIG. 9; and

FIG. 11 is a detail.

In the accompanying drawings, the supporting purlins are denoted by reference 1 and the plastic sheeting element by reference 2.

The sheeting is secured in each case by a bottom slideway 3 formed with projections 4 for securing to the purlin 1, for example through the agency of screws 5 etc., and a top sliding member 6 secured to a sheeting element 2, for example by rivets 7.

The top slideway is formed by a U-shaped sheet-metal member, the ends of the flanges of which are bent over at 8 to engage in grooves 9 in the bottom slideway 3.

In FIGS. 3 and 4, the various sheeting elements are connected together by adhesive (reference 10) or by screws, rivets, bolts, etc.

Expansion or contraction of the sheeting as a result of temperature variations is possible because the sliding members and slideways may move relative to one another.

The sheeting elements may be made independently movable or relatively displaceable by the use of battens 11–12 (FIGS. 4 and 5) disposd parallel to the purlins 1 and connected to the sheets 2 by a pivot 13 rigidly connecting the sliding member 6 to the sheeting element 2 but engaging with clearance in apertures 14–15 formed in the battens 11–12 (FIG. 11).

With reference to FIGS. 7–10, the top sliding member $6^1$–$8^1$ is secured to the underside of a gutter 16, rigidly connected to which are lugs 17, the top ends of which are bent over at 18 where the corrugated sheeting 2 is secured either by rivets $7^1$ or by a system of the kind shown in FIG. 11 when independent sheeting elements and battens 11–12 are used (FIGS. 9 and 10).

It will be apparent that the sheeting elements are prevented from knocking by adaptation of the shape of the gutter to the shapes of the corrugations used.

The dimensions of the sliding members and slideways, and the material used, depend on the shape of the corrugations used and the magnitude of the displacement allowed.

In each of the embodiments the elimination of hooks gives a cleaner internal appearance and the reduction of the number of bores in the sheeting gives greater sealing-tightness.

The possible displacement facilitates the installation of very long sheeting.

Saving in labor is also an important feature.

What I claim is:

1. A construction for supporting corrugated roofing sheets on rafters or the like comprising, in combination, slideways extending along the rafters; slides slidably engaged with said slideways for relative movement therealong; at least one gutter extending transversely of said slideways and having its underside secured to said slides; and means securing said gutter to the undersurfaces of the roofing sheets; said gutter gathering water of condensation from the undersurfaces of the roofing.

2. A construction, as claimed in claim 1, in which the means securing said gutter are tongues spaced therealong and extending upwardly into engagement with the undersurfaces of the roofing sheets.

3. A construction, as claimed in claim 2, in which said tongues have lips bent from their free ends for securement to the undersurfaces of the roofing sheets.

4. A construction, as claimed in claim 1, in which said slideways are formed with grooves in each of a pair of lateral longitudinally extending edges thereof; said slides comprising inverted channel members having inturned lips along the edges of the channel legs and engaged in said grooves.

5. A construction, as claimed in claim 1, including battens extending transversely of the corrugations of the roofing sheets and secured to the roofing sheets by said last-name means.

6. A construction, as claimed in claim 1, in which said last-named means comprises pivot means connecting said gutters to said roofing sheets.

7. A construction, as claimed in claim 6, including battens extending transversely of the corrugations of said roofing sheets, said pivot means anchoring said battens to said roofing sheets and extending, with clearance, through apertures in said battens for relative displacement of said battens and said roofing sheets and slides.

References Cited

UNITED STATES PATENTS

| | | | |
|---|---|---|---|
| 154,297 | 8/1874 | Taylor | 52—534 |
| 1,192,654 | 7/1916 | Lyon | 52—200 |
| 1,634,288 | 7/1927 | Hoefel | 52—95 |
| 1,835,784 | 12/1931 | Kiefer | 52—200 |
| 2,192,719 | 3/1940 | Tapman | 52—537 |
| 2,234,799 | 3/1941 | Eason | 52—465 |
| 2,857,995 | 10/1958 | Boulton | 52—534 |

JOHN E. MURTAGH, *Primary Examiner.*

C. G. MUELLER, R. A. STENZEL, *Assistant Examiners.*